United States Patent [19]
Wilkins

[11] 3,867,763
[45] Feb. 25, 1975

[54] SETTING FIXTURE FOR MACHINE TOOLS

[75] Inventor: Albert Arthur Wilkins, Coventry, England

[73] Assignee: Wickman Machine Tool Sales Limited, Coventry, Warwickshire, England

[22] Filed: Oct. 19, 1972

[21] Appl. No.: 300,582

Related U.S. Application Data

[63] Continuation-in-part of Ser. No. 52,849, July 7, 1970, abandoned.

[30] Foreign Application Priority Data
July 7, 1969 Great Britain .................... 34135/69

[52] U.S. Cl. .............................. 33/185 R, 82/34 R
[51] Int. Cl. ............................................ B27g 23/00
[58] Field of Search ........ 33/185 R, 181 R; 82/34 R

[56] References Cited
UNITED STATES PATENTS

| | | | |
|---|---|---|---|
| 3,200,506 | 8/1965 | Jeanneret ........................... | 33/185 R |
| 3,417,478 | 12/1968 | Jeanneret ........................... | 33/185 R |
| 3,555,690 | 1/1971 | Matthey ............................. | 33/185 R |
| 3,600,815 | 8/1971 | Link .................................. | 33/185 R |
| 3,625,097 | 12/1971 | Harkness ........................... | 33/185 R |

*Primary Examiner*—William D. Martin, Jr.
*Attorney, Agent, or Firm*—Hoiman & Stern

[57] ABSTRACT

A setting fixture for machine tools having a base on which are mounted slide-representing parts having respective mounting means corresponding to similar mounting means on a machine tool, a setting block securable to any one of the mounting means and an adjustable stop means detachably securable to the setting block, the arrangement being such that a tool and tool holder can be set up on the slide-representing parts of the fixture and adjusting them to their required position, and then transferring them to the machine for which they are required, together with the appropriate setting block and adjustable stop whereby they can be set up on the machine in equivalent positions.

6 Claims, 7 Drawing Figures

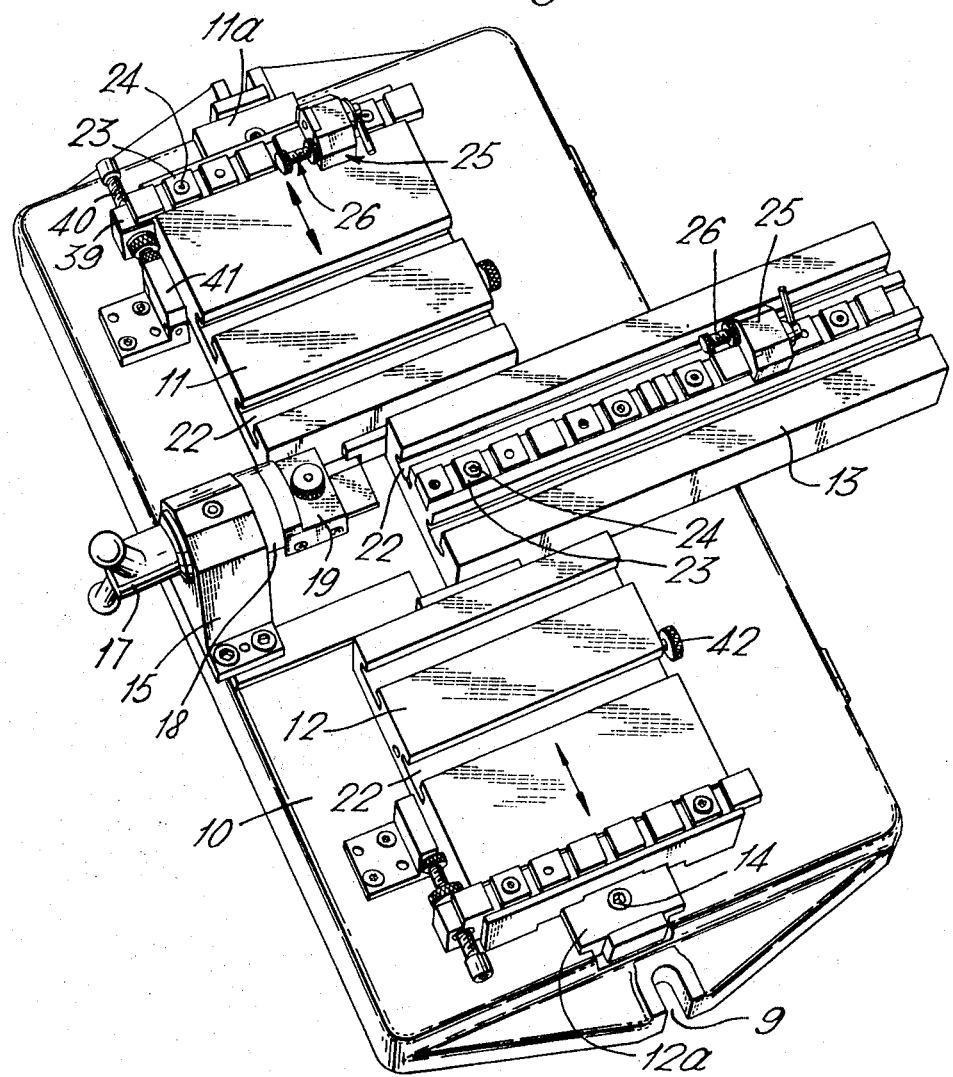

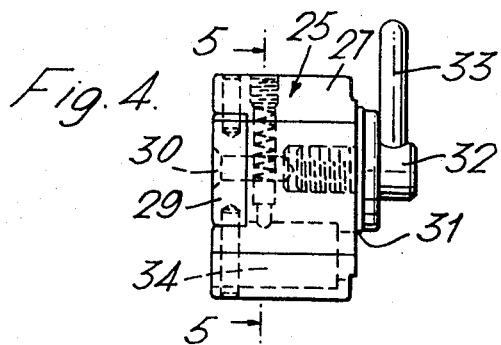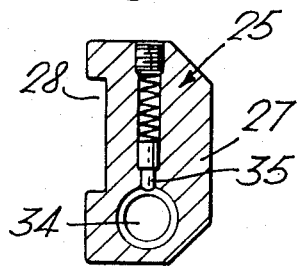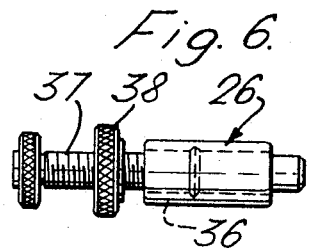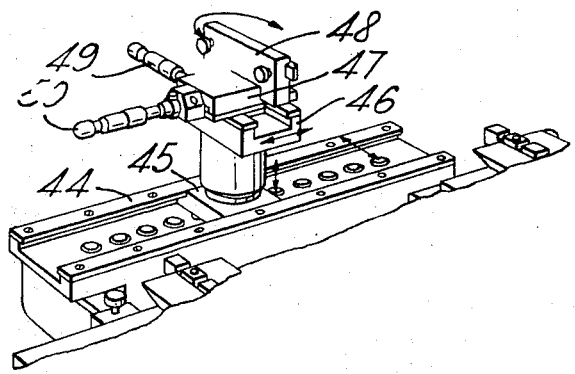

SETTING FIXTURE FOR MACHINE TOOLS

This application is a continuation-in-part of Ser. No. 52,849, filed July 7, 1970, now abandoned.

BACKGROUND OF THE INVENTION

This invention relates to setting fixtures for machines such as lathes having multiple slides, the setting fixture being of the kind comprising a support, means on the support for carrying a workpiece or replica of at least a part thereof, at least two parts mounted on the support representing slides, the workpiece carrying means and the slide representing parts being disposed in similar relationship on the support to the equivalent parts on the machine for which the setting fixture is used, and means on each of the slides to which tool holders can be secured, the arrangement being such that tool holders can be set on the fixture in correct relationship to the workpiece or replica thereof, so that when transferred to the machine in the same relationship, tools mounted on the tool holders will cut an accurate workpiece.

This arrangement enables a part of the setting up operation for the machine to be carried out away from the machine, thus affording a saving in the time involved in altering a machine so as to produce a different workpiece, because the machine is idle for a shorter period.

OBJECTS AND SUMMARY OF THE INVENTION

The object of the present invention is to provide a setting fixture of the kind specified in a form enabling substantial machining time saving to be obtained and furthermore providing for setting up of tools in a particularly convenient form.

In accordance with the present invention, there is a setting fixture of the kind specified having slide-representing parts which each have a plurality of spaced mounting means corresponding in position to similar means on the machine, a setting block detachably securable to any one of said mounting means and an adjustable stop means detachably securable to the setting block, the arrangement being such that when a tool holder is mounted on its slide-representing part in correct relationship to the workpiece or its replica, a setting block and adjustable stop are mounted on an appropriate one of the mounting means with the adjustable stop adjusted to engage the tool holder, and when the tool holder, and adjustable stop on a setting block have been transferred to equivalent positions on the machine, an accurate workpiece can be produced.

In accordance with a further aspect of the present invention, a method of setting a tool and tool holder on a machine comprises the steps of mounting the tool and tool holder on a slide-representing part of a setting fixture of the kind specified, so that it is in correct relationship to the workpiece or its replica, mounting a setting block on an appropriate one of a plurality of mounting means on the slide-representing part, an adjustable stop being secured to the setting block, adjusting the adjustable stop on the setting block until it engages the tool holder, transferring the tool holder and tool, and the adjustable stop on a setting block to corresponding mounting positions on the machine and finally securing the tool holder to its slide.

BRIEF DESCRIPTION OF THE DRAWINGS

The invention will now be described by way of example with reference to the accompanying drawings in which, FIG. 1 is a perspective view of a setting fixture constructed in accordance with the invention, FIG. 4 is an underneath plan view of a setting block intended to be fitted onto the setting fixture, FIG. 5 is a cross-sectional view on the line 5—5 in FIG. 4, the view looking in the direction of the arrows, FIG. 6 is a side elevation view of a detachable adjustable stop for mounting in the unit of FIG. 4 and FIG. 7 is a view in perspective of an alternative form of workpiece mounting.

DETAILED DESCRIPTION OF THE INVENTION

The setting fixture illustrated is intended for use with a machine tool such as an automatic lathe having tool carrying structures comprising two slides respectively movable towards and away from the axis of rotation of a workpiece chuck in directions which are transverse with respect to the axis, as well as a longitudinally movable turret.

Figure 2:
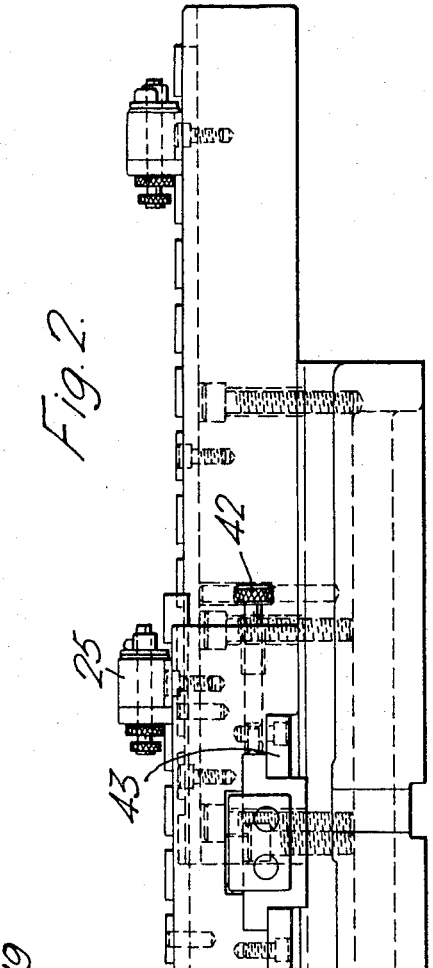
FIG. 2 is a side elevation view of the fixture.

The setting fixture illustrated in FIGS. 1 and 2 comprises a support 10 in the form of a generally rectangular casting upon which are mounted parts representing the slides and the turret. Openings 9 in end flanges are provided to accept fixing bolts. The slides are represented by plates 11 and 12 respectively, and the turret is represented by a plate 13.

Figure 3:
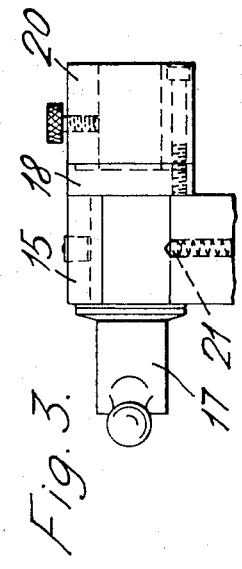
FIG. 3 is a fragmentary view showing an alternative form of workpiece mounted thereon.

Also fixed onto the support 10 is a workpiece carrying means comprising a bracket 15 bolted to the support in which is carried a threaded rod 16 engaging in a nut 17 which is formed with a pair of integral arms whereby it can be rotated manually. The other end of the threaded rod 16 is connected to a part 18 to which is secured a workpiece replica mounting 19. The workpiece replica (not shown) is secured to the mounting 19 and is merely a flat metal plate, one edge of which has the contour of the desired workpiece. The workpiece replica is contoured only in two dimensions, but FIG. 3 shows an alternative arrangement whereby an actual workpiece of cylindrical form (not shown) can be mounted upon the workpiece carrying means of the fixture in the cylindrical portion 20.

A spring loaded ball 21, within the bracket 15, engaging the threaded rod 16 enables this part of the fixtures to be rotated to an angular position, representing tools presented at an angle on the machine.

The slide-representing parts 11 and 12 and the turret representing part 13 have respective pairs of parallel T-shaped cross section slots 22, with these slots 22 extending transversely on the fixture, that is in a direction parallel to a plane passing through the center of the fixture and containing the axis of rotation of the rod 16 of the workpiece carrying means.

On the slide representing parts 11 and 12, the slots 22 are nearer to the inner ends of these parts and at their outer ends, each of the slide representing parts 11, 12 has a plurality of equally spaced blocks 23 fixed by bolts 24 to the parts 11 or 12 with these blocks being numbered for identification. The blocks are square as viewed in plan and are of equal size and they extend in a line which is parallel to the longitudinal axes of the slots 22. The blocks may be formed on a separate strip secured to the parts 11, 12 and 13.

The turret representing part 13 has, between its two T-shaped cross-section slots 22, a line of equally spaced blocks which are identical with the blocks 23 on the slide-representing parts 11 and 12.

Detachably securable to any one of the blocks 23 is a setting block 25 in which can be mounted an adjustable stop 26. The setting block 25 is illustrated in FIGS. 4 and 5 and the stop is illustrated in FIG. 6. The setting block 25 comprises a body 27 having a wide slot 28 along its underneath surface. This slot terminates at one end at a plate 29 which is secured to the body 27 by a screw 30. The opposite end of the slot 28 can be closed in part by a disc 31 carried by a screw 32 engaging in the body 27 and having an extension arm 33 whereby it can be moved angularly. The width of the slot 28 is equal to, or slightly greater than, the width of the blocks 23 and the distance between the plate 29 and the disc 31 can be varied by angular movement of the bolt 32. Such variation in the length is sufficient to enable the setting block to be clamped on any one of the blocks 23. In practice 120° of angular movement of the bolt 32 is sufficient to afford clamping action on the block 23.

In the body 27 of the setting block 25 is a stepped bore 34 into which protrudes a spring loaded plunger 35.

The adjustable stop 26 comprises a sleeve 36 which is engageable in the larger diameter portion of the stepped bore 34 of the setting block 25 and within the sleeve 36 is a screw threaded rod 37 with a knurled head. Engaging on this rod which can be adjusted lengthwise in the sleeve 36, is a knurled locking nut 38.

The spring loaded plunger 35 in the body of the setting block 25 serves to hold the adjustable stop 26 in its bore 34, but permits it to be snapped into and out of engagement with the unit when desired. The sleeve 36 has a small flat on its surface to engage with the plate 29 to prevent rotation of the sleeve when the rod 37 is adjusted.

At one end of each of the slide-representing parts 11, 12 there is attached a further setting block 39, the position of which, however, is fixed. Detachably mounted in this setting block is an adjustable stop 40 whereby the required travel of the tool slide can be set against a fixed abutment 41 secured to the support 10. This determines the position of the tool slide within its adjustment to be reproduced on the machine.

In this example, the slide-representing parts 11, 12 are mounted on slideways 11a and 12a which are secured to the support 10 by means of bolts 14. Stops 43 are secured to the parts 11 and 12 respectively. Locking bolts 42 secure the parts 11, and 12 to the slideways 11a 12a when a selected position is reached. Part 13 is secured directly to the support 10.

The slide-representing parts 11, 12 and the turret-representing part 13 are in the same relationship to the work-piece replica as are the equivalent parts upon the machine tool in their fully forward position.

The slides and turret on the machine have T-shaped slots of identical proportions and positions as those on the parts 11, 12 and 13 of the fixture.

The slides and turret on the machine, moreover, have blocks identical with the blocks 23 and 41 on the parts 11, 12 and 13 respectively and such blocks on the machine are in the same relationship to the T-shaped slots as are these features of the parts 11, 12 and 13.

In order to set up the tools for a machine, the procedure is to fit onto the workpiece carrying means of the setting fixture, a workpiece or replica thereof at 19 or 20. The position of this is adjusted so as to correspond with the position of the workpiece in the machine chuck.

Tools of the correct type are now fitted into respective tool holders which are mounted onto the slide-representing parts 11 and 12 and the turret-representing part 13, the tools and tool holders being adjusted so that the correct overhang of the tool from the tool holder is achieved, and the cutting tip of the tool engages that portion of the profile of the workpiece which it is intended to cut.

The tool holders are now secured to the parts 11, 12 and 13 by conventional clamps engaging in the T-shaped slots 22.

A setting block 25 is now fitted onto part 11, on an appropriate one of the blocks 23 in a position such that the adjustable stop 26 can be adjusted so that the heads of the threaded rods 37 of each engages a selected pad on the tool holder mounted on that part. This is repeated for parts 12 and 13 using one adjustable stop 26 for each associated tool holder. However, only one setting block 25 is required since the adjustable stop is removed from the setting block after each setting operation (for some positions an opposite hand setting block is required).

A further adjustable stop 40 is mounted in the setting block 39 on each of the slide representing parts 11 and 12 to engage with the abutment 41.

It is only necessary for one adjustable stop to be used for the turret-representing part 13 since the turret on the machine is only capable of movement in one direction, namely lengthwise of the axis of rotation of the workpiece.

When all the tool holders have been set with their tools in the manner described, they are detached from the setting fixture and are mounted upon the machine tool slides and turret respectively in identical relationship. In order to ensure such identical relationship, the adjustable stops 26 accompany their respective tool holders and are mounted in setting block 25 on blocks on the slides of the machine equivalent to the blocks 23. There is no necessity for the setting block 25 to accompany the tool holders and in practice the tool holders will be supplied to a machine setter with a series of adjustable stops 26 and 40, with the adjustable stops being carried in a mount which has identification marking for aiding the correct positioning of the adjustable stops upon the machine.

With this arrangement, accurate workpieces can be produced with a minimum waste of setting time and thus minimizing time wasting while the machine is idle.

If the workpiece is particularly large, the workpiece carrying means can be replaced by a mounting which carries, instead of the workpiece or workpiece replica, a part which represents a corner of the workpiece only. Such a mounting is shown in FIG. 7 which shows a transversely extending portion 44 of the support 10 on which is mounted a table 45 to which is connected a slide 46. On this, in turn, is mounted a further slide 47 with a mounting 48 to which is attached the part representing the corner of the workpiece. The slides 46, 47 can be adjusted by micrometers 49, 50 respectively.

The mounting table 45 is connected to the slide 46 such that the table 45 can be positioned at spaced intervals along portion 44.

Having thus described my invention what I claim as new and desire to secure by Letters Patent is:-

1. A setting fixture for a machine, said fixture comprising a support, at least two slide-representing parts mounted on the support, means on the support for carrying a workpiece, said slide-representing parts having respective sets of spaced mounting means, a setting block detachably securable to any one of said mounting means, and an adjustable stop detachably securable to the setting block, and means for mounting tool holders from a machine on the respective slide-representing parts, in equivalent relationship to the workpiece to their positions on the machine, and adjustable stops mounted on each part by means of respective setting blocks, said adjustable stops being adjustable to engage the tool holders respectively.

2. A setting fixture as claimed in claim 1 in which the mounting means are respective blocks secured to the slide-representing parts, the setting block being detachably securable thereon.

3. A setting fixture as claimed in claim 1, in which the slide-representing parts comprise respective parts representing transversely moving slides on a machine and a further part representing a longitudinally movable turret on the machine.

4. A setting fixture as claimed in claim 1, in which the unit comprises a member in which can be detachably fitted an adjustable stop in the form of a screw and sleeve assembly.

5. A setting fixture as claimed in claim 1, in which at least one of the slide-representing parts has a further setting block detachably securable to it, said further unit mounting a further adjustable stop.

6. A setting fixture as claimed in claim 1 in which the workpiece support has means for adjustment of said workpiece relatively to the slide-representing parts.

* * * * *